Aug. 4, 1959
C. W. LINCOLN ET AL
2,897,684
IN-LINE HYDRAULIC POWER STEERING GEAR
Filed May 21, 1954
3 Sheets-Sheet 1
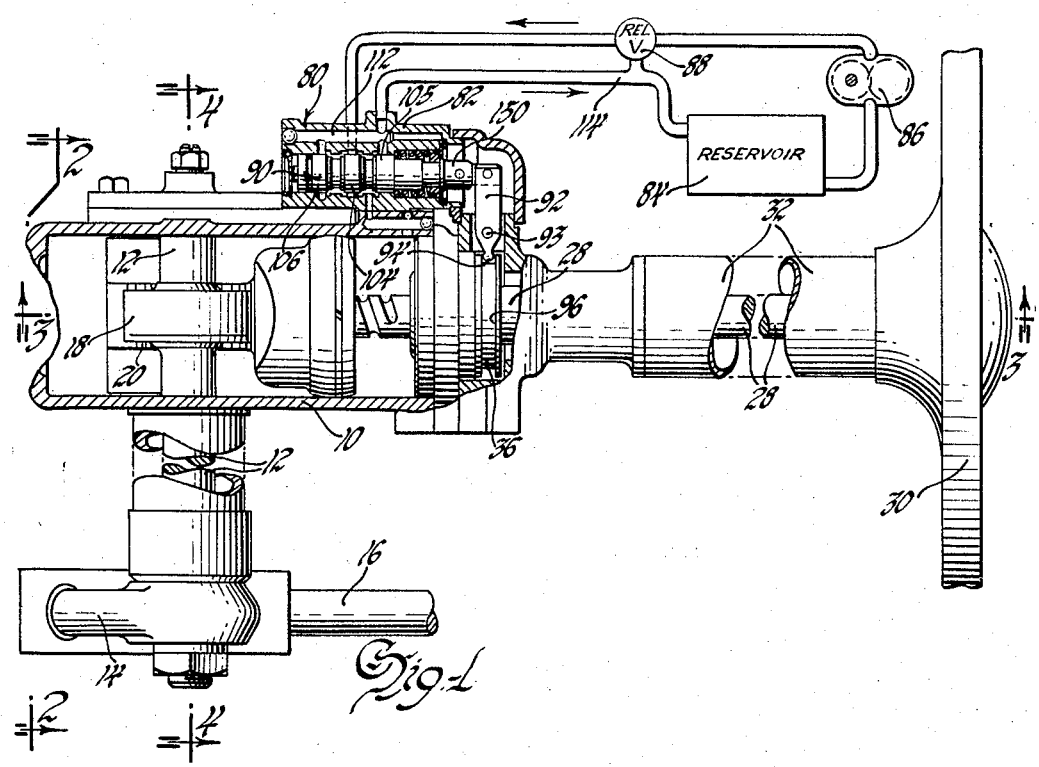
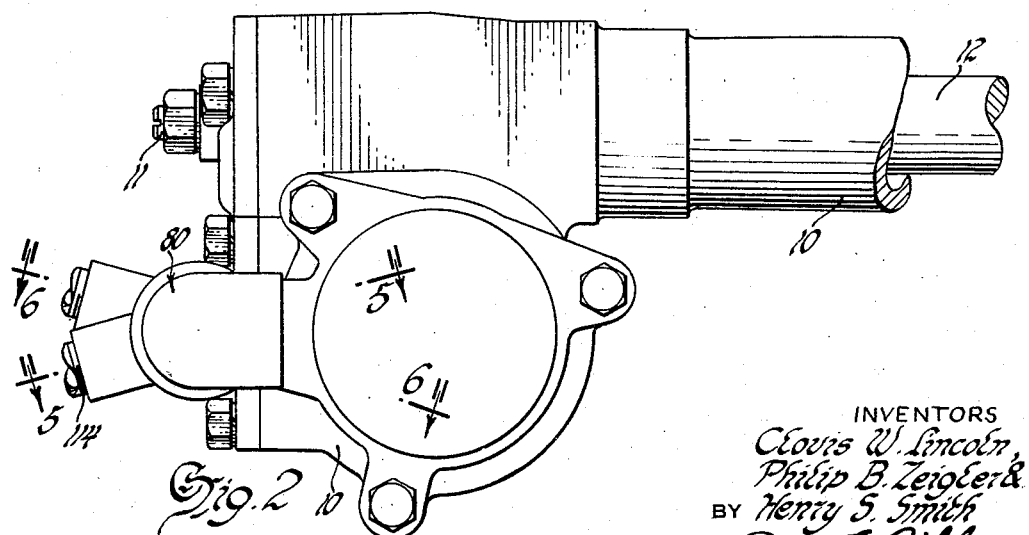
INVENTORS
*Clovis W. Lincoln,
Philip B. Zeigler &
BY Henry S. Smith*
*C. F. Dibble*
ATTORNEY

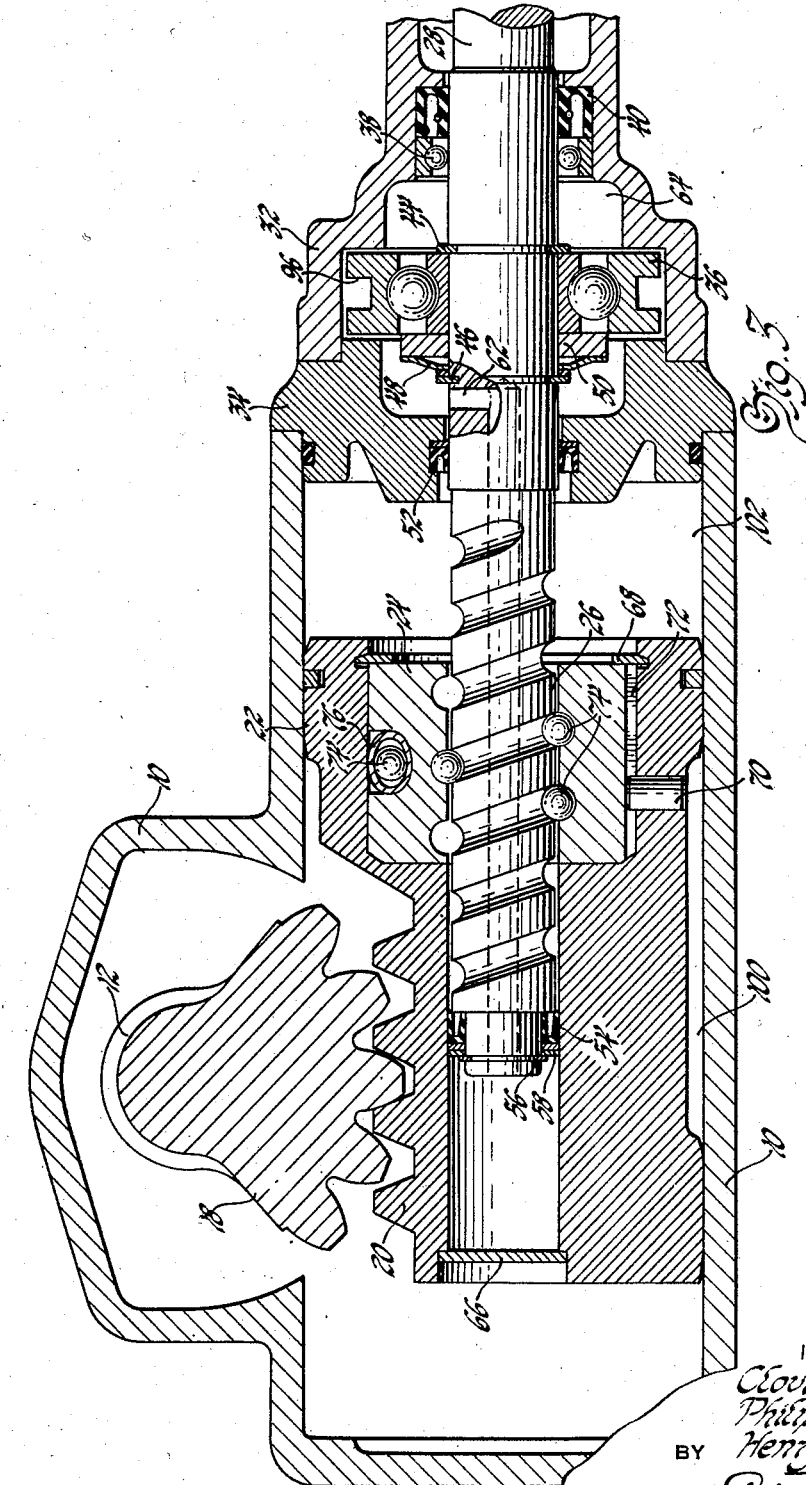

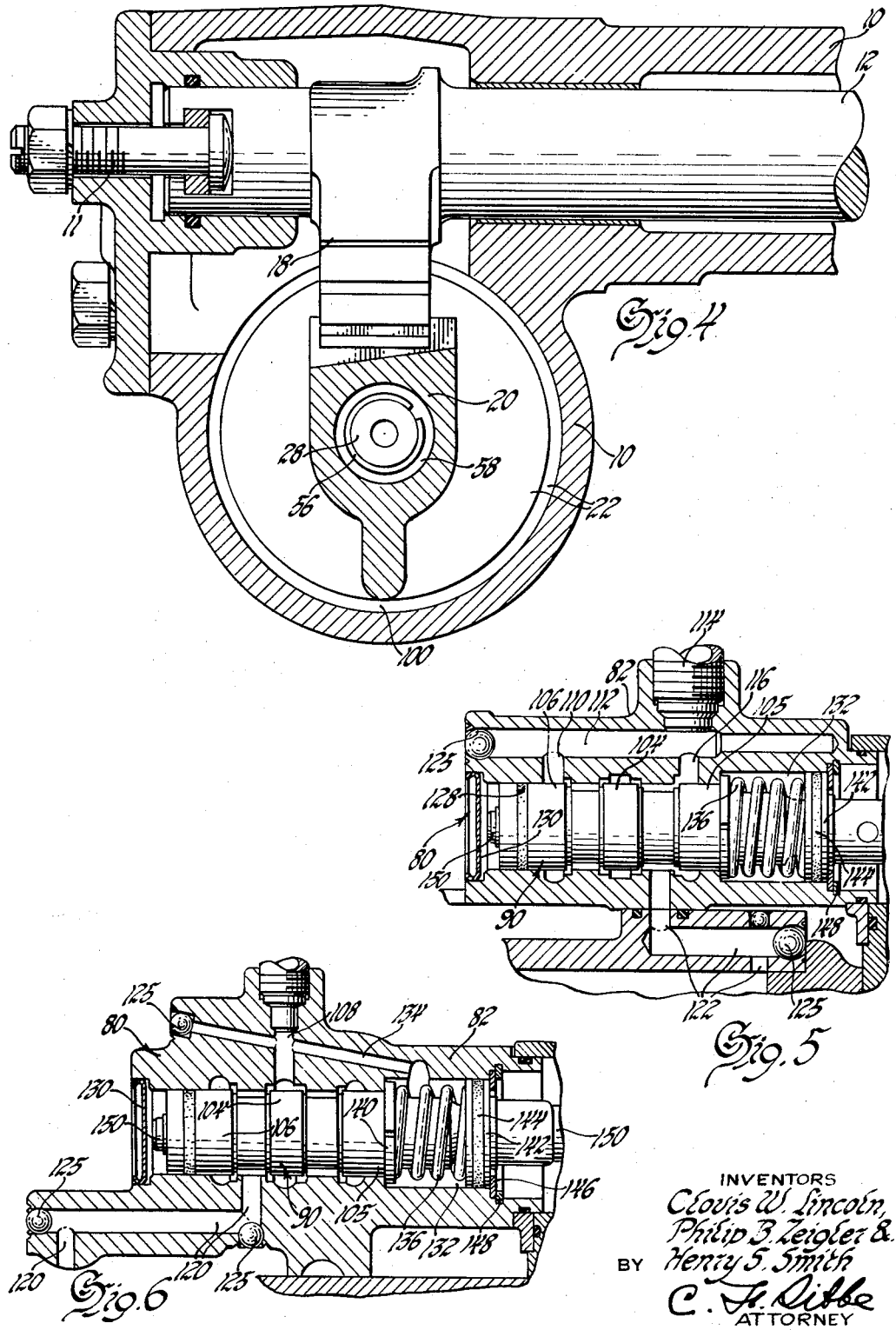

United States Patent Office 2,897,684
Patented Aug. 4, 1959

2,897,684

IN-LINE HYDRAULIC POWER STEERING GEAR

Clovis W. Lincoln, Philip B. Zeigler, and Henry S. Smith, Saginaw, Mich., assignors to General Motors Corporation, Detroit, Mich., a corporation of Delaware Application May 21, 1954, Serial No. 431,422

5 Claims. (Cl. 74—388)

This invention relates to fluid power steering and more particularly concerns a hydraulic power steering gear of unique construction and operation.

The increasing number of accessory devices with which automobiles are being equipped presents a very real problem to engineers and designers charged with finding room for the accessories and the associated equipment. The problem is complicated by the fact that in most cases either the accessory itself or some related part must by practical necessity be located under the engine hood or bonnet. In such a circumstance, any new accessory of the type associated with normal or standard equipment so as to modify or improve the operation thereof, if ideally designed, would not substantially increase space requirements over those pre-existing.

As indicated, our invention has as its principal object to provide power steering apparatus of such character that it may be built into a standard steering gear, so to speak, without substantially increasing the over-all dimensions of the gear.

A corollary object of the invention is to accomplish the foregoing object without any sacrifice in operating characteristics and efficiency.

Still other objects and features of the invention will be apparent from the following description of a preferred embodiment thereof. The description will proceed with reference to the accompanying drawings in which:

Figure 1 is a broken plane view in which certain parts appear in section;

Figure 2 is a view taken on the line 2—2 in Figure 1;

Figure 3 is a longitudinal section through the gear box;

Figure 4 is a section on the line 4—4 in Figure 1; and

Figures 5 and 6 are sections taken on the lines indicated in Figure 2.

In the drawings, and referring first to Figure 1, the numeral 10 denotes a casing or a gear box of generally cylindrical conformation. Disposed partly within such casing and extending at one side thereof is a cross or rock shaft 12 connected externally of the casing with a Pitman arm 14 through which a drag link 16 is actuated. The linkage beyond the drag link may be assumed as conventional.

Fixed to or integral with the rock shaft 12, within the casing 10, is a gear sector 18 (Figure 4), the teeth of which mesh wtih those of a rack 20 formed integral with a piston 22 reciprocal within the casing. A screw device 11 (Figure 4) of known construction allows for the adjustment of lash between the teeth.

Piston 22 is bored and counterbored to accommodate a ball nut 24 and the worm end 26 of a steering shaft 28 which terminates at its upper end (Figure 1) in the usual steering wheel 30.

Shaft 28 is shown as surrounded mediate the wheel 30 and the casing 10 by the usual tubular column or jacket 32. At its lower end column 32 is shouldered into an adaptor plate 34 closing the upper end of the casing 10 (Figure 3) and confining a thrust bearing 36, the purpose of which will later appear. This bearing will be noted as held to the steering shaft 28 via rings 44 and 46 accommodated in annular grooves formed in the shaft. A bellville washer 48 operating against a thrust ring 50 adjacent the bearing 36 facilitates assembly of the gear. Just upwardly of the thrust bearing is a conventional ball bearing 38 and an oil seal 40.

Steering shaft 28, which is supported for limited axial movement, extends through a seal 52 in the adaptor 34 and carries a seal 54 at its lower tip end, the latter seal being held in place via a lock ring 56 and retainers 58. The shaft has a central bore extending through the worm portion thereof and connecting with a short passageway 62 leading to the chamber 64 within which the thrust bearing 36 is disposed. The purpose of these passageways is to bleed the cavity between the tip end of the worm portion of the shaft and the closure cap 66.

Ball nut 24 is held in place within the piston 22 via a lock ring 68. It is believed evident from this arrangement that relative axial movement, as between the nut and piston, is not possible. A pin 70 received in a keyway 72 formed in the nut prevents relative rotary movement of the two parts. Except for the keyway, the ball nut is substantially structurally identical to the conventional article well known in the art. In this circumstance, a detailed description thereof is believed unnecessary. Suffice it to say that as the steering shaft 28 is rotated, the nut, and with it the piston, tends to move axially of the casing 10 by reason of the helical ball connection interconnecting the shaft and nut. The balls 74 are returned from one end of the nut to the other via a return tube 76 appearing in section in Figure 3.

Reverting now to Figure 1, there will be seen a valve 80, the housing 82 of which is fixed to the casing 10. Such valve controls the flow of fluid, normally a mineral oil of suitable viscosity characteristics, between the casing 10, in effect a power cylinder, and a reservoir 84, illustrated diagrammatically. This reservoir serves a pump 86, discharging through a relief valve 88 which becomes effective to by-pass fluid to the reservoir whenever the pressure in the hydraulic circuit becomes excessive, damage to any of the component parts of the system being thereby prevented.

Valve 80 is of the so-called "open-center" type and comprises a spool 90 which is linked through a lever 92, pivoted at 93, and through the previously mentioned thrust bearing 36, to the steering shaft 28. Lever 92 terminates in a tongue 94 received within an annular groove 96 (Figure 3) formed in the thrust bearing.

Clearly, any resistance of the rock shaft 12 to turning incident to the rotation of the steering shaft 28 will result in a reactionary thrust on the shaft 28 tending to impart axial movement thereto. It is this axial movement which is utilized to bring about automatic actuation of the spool 90. That the bearing 36 partakes of any axial movement of the steering shaft should be obvious, considering the nature of the connection between the bearing and the shaft. Assuming downward or leftward axial movement of the steering shaft, corresponding to a right turn, the spool will be displaced to the right, a condition resulting in the creation of a pressure differential within the casing 10 in favor of the left-hand chamber 100 thereof. Conversely, upward or rightward axial movement of the steering shaft 28 brings about leftward displacement of the spool 90 with the pressurization of the upper chamber 102 of the casing 10.

As best seen from Figures 5 and 6, spool 90 is formed with three lands 104, 105, and 106. With the spool centered in the housing 82, as shown, the stream of fluid entering the passageway 108 (Figure 6) from the pump is divided at the central land 104. The part diverted to the left flows about the spool to enter passageway 110

(Figure 5) which interconnects with a longer passageway 112 extending to the exhaust line 114 to the reservoir. Similarly, the part diverted to the right flows about the spool to the passageway 116 which also connects with the exhaust line. In either case, the flow of liquid is against the static pressure of the fluid contained in the casing 10, passageways 120 (Figure 6) and 122 being open, respectively, to the left and right-hand chambers of the casing. Now on movement of the spool in either direction, it should be clear that the fluid flow is partially or completely restricted to one or the other side of the valve, depending upon the direction of the movement. Thus, if the spool is displaced to the right, the consequent blocking off of the right side of the valve results in the building up of a pressure in the left-hand chamber of the casing 10, providing the desired power assist. With the spool so displaced, land 106 partially or completely seals off the left-hand chamber of the casing from the exhaust passageway 112, while the opposite chamber of the casing is necessarily open to such passageway to a greater extent than when the spool is in neutral position. Obviously, when the spool is displaced to the left rather than the right, the effect is just the reverse of that described.

It will be understood that balls 125 are merely plugs closing the ends of the bore holes.

Land 106 is of somewhat greater width than the other end land 105 and is grooved to accommodate a seal 128, preventing leakage past the cap piece 130 fitted into the valve housing. At the opposite end of the spool 90 is a chamber 132 which is open at all times to the inlet passageway 108, a diagonally disposed passageway 134 being provided for this purpose. Accordingly, the fluid pressure in such chamber always conforms to the maximum pressure in the system. This pressure, with the spring 136, presents a resistance to movement of the spool in either direction. In other words, the fluid pressure and the spring tend to maintain the valve spool centered at all times, a condition which incidentally operates to provide a sense of "feel" at the steering wheel 30. Significantly, the resistance sensed at the wheel is proportionate to the actual steering resistance, since the pressure in the chamber increases with the power demand. Spring 136 exerts its thrust against a left-hand seat 140 and a right-hand seat 142. The latter carries an oil seal 144 and abuts a stop ring 146, held in place by a ring 148 received in a groove formed in housing 82. The spool stem 150, through which the spool is linked to the previously mentioned lever 92, extends throughout the length of the spool which is made hollow to receive the stem. The latter being formed to provide an annular shoulder against which the outer face of washer 142 abuts, on leftward movement of spool 90, the washer is carried along against the resistance of the pressure of the fluid in the chamber 132 and the resistance of the spring 136. Seal 144 prevents the escape of fluid past the washer. On rightward movement of the valve spool, the surface for fluid reaction, serving to provide the previously mentioned "feel," is the right-hand end of the spool 90. The fit of washer 140 around the stem 150 is relatively loose; hence the inner face of this washer has little if any effect on the reaction characteristics of the valve.

What we claim is:

1. A fluid power steering gear including a rock shaft having tooth means associated therewith and confined within a casing lending support to said shaft, a steering shaft having a worm end extending into said casing, a piston member within said casing having tooth means complementary to said first-mentioned tooth means, said piston member being formed to accommodate and envelop said end of said steering shaft and a ball nut surrounding said end, the ball nut being so held within said piston as to preclude relative axial movement therebetween, a source of fluid pressure, and valve means in circuit with said source and said casing through which one side or the other of said piston is pressurized as determined by the direction said steering shaft is rotated, said valve being operably connected to said steering shaft for actuation thereby on the application of manual effort to said steering shaft.

2. A fluid power steering gear including a rock shaft having tooth means associated therewith and confined within a casing lending support to said shaft, a steering shaft having a worm end extending into said casing, a piston member within said casing having tooth means complementary to said first-mentioned tooth means, said piston member being formed to accommodate and envelop said end of said steering shaft and a ball nut surrounding said end, the ball nut being so held within said piston as to preclude relative axial movement therebetween, a valve housing fixed to said casing and having ports therein interconnecting with ports in said casing extending to opposite sides of said piston, said housing being in fluid circuit with said source and confining a movable element through which a pressure differential may be created in favor of one side or the other of said piston as determined by the direction said steering shaft is rotated, said valve means being operably connected to said steering shaft for actuation thereby on the application of manual effort to said steering shaft.

3. A fluid power steering gear including a rock shaft having tooth means associated therewith and confined within a casing lending support to said shaft, a unisectional steering shaft supported for limited axial movement and having a worm end extending into said casing, a piston member within said casing having tooth means complementary to said first mentioned tooth means, said piston member being formed to accommodate and envelop said end of said steering shaft and a ball nut surrounding said end, the ball nut being so held within said piston as to preclude relative axial movement therebetween, a valve housing fixed to said casing and having ports therein interconnecting with ports in said casing extending to opposite sides of said piston, said housing being in fluid circuit with said source and confining a movable element through which a pressure differential may be created in favor of one side or the other of said piston as determined by the direction said steering shaft is rotated, said movable valve member being linked to said steering shaft via lever means whereby axial movement of said steering shaft, induced by reactionary thrust, automatically effects actuation of said movable member.

4. A fluid power steering gear including a rock shaft having motion transmitting means associated therewith and confined within a casing lending support to said shaft, a steering shaft supported for limited axial movement and extending into said casing, a piston member within said casing, means operably interconnecting said rock shaft, said steering shaft and said piston member, a source of fluid pressure, a valve housing fixed in proximity to said casing and having ports therein interconnecting with ports in said casing extending to opposite sides of said piston, said housing being in fluid circuit with said source and confining a reciprocable valve member through which a pressure differential may be created in favor of one side or the other of said piston, as determined by the direction said steering shaft is rotated, so as to give a power assist to the manual effort applied to the steering shaft, said reciprocable valve member being linked to said steering shaft via lever means whereby axial movement of said steering shaft, induced by reactionary thrust, automatically effects actuation of said reciprocable valve member and means associated with said valve housing defining a chamber at one end of said reciprocal valve member, said chamber being in open communication at all times with said source of fluid pressure, the fluid contained therein being applied in opposition to movement of said reciprocal valve member thereby to provide a steering feel in both directions of rotation of said steering shaft.

5. A fluid power steering gear including a rock shaft having motion transmitting means associated therewith and confined within a casing lending support to said shaft, a steering shaft extending into said casing, a piston member within said casing, means operably interconnecting said rock shaft and said piston member, means operably interconnecting said steering shaft and said piston member, said last mentioned means surrounding said steering shaft and being in turn enveloped by said piston member, a source of fluid pressure, a valve housing fixed in proximity to said casing and having ports therein interconnecting with ports in said casing extending to opposite sides of said piston, said housing being in fluid circuit with said source and confining an element operably connected to said steering shaft for actuation thereby, whereby a pressure differential may be created in favor of one side or the other of said piston, as determined by the direction said steering shaft is rotated, so as to give a power assist to the manual effort applied to the steering shaft, and means associated with said valve housing defining a chamber at one end of said element, said chamber being in open communication at all times with said source of fluid pressure, the fluid contained therein being applied in opposition to movement of said element thereby to provide a steering feel in both directions of rotation of said steering shaft.

References Cited in the file of this patent

UNITED STATES PATENTS

| | | |
|---|---|---|
| 2,587,495 | MacDuff | Feb. 26, 1952 |
| 2,605,854 | MacDuff | Aug. 5, 1952 |
| 2,682,778 | Creson et al. | July 6, 1954 |